Figure 2:
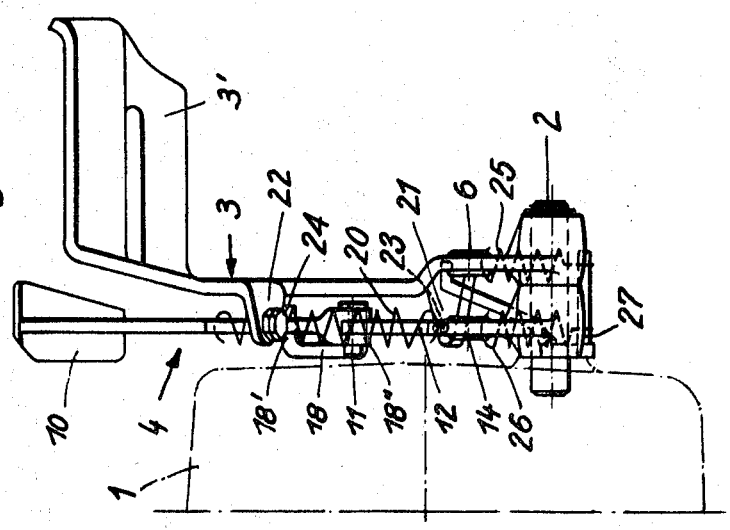

United States Patent

[11] 3,559,783

| [72] | Inventors | Herbert Haberzetti<br>Ebersbergestrasse 36, 8011 Hohenlinden, Germany;<br>Jean N. Logothetopoulos,<br>Habsburgerstrasse 5, 8 Munich, 13, Germany |
|---|---|---|
| [21] | Appl. No. | 825,013 |
| [22] | Filed | May 15, 1969 |
| [45] | Patented | Feb. 2, 1971 |
| [32] | Priority | May 15, 1968 |
| [33] | | Germany |
| [31] | | 1,755,481 |

[54] CLUTCH CONTROLS FOR TRACTOR VEHICLES
7 Claims, 2 Drawing Figs.

[52] U.S. Cl. .................................................. 192/48.7, 74/478.5, 192/99
[51] Int. Cl. ........................................................ G05g 13/00
[50] Field of Search ........................................... 192/48.7, 48.9, 48.91, 99, 99(S); 74/478, 478.5, 480, 491

[56] References Cited

UNITED STATES PATENTS

| 2,991,862 | 7/1961 | Glesmann | 192/48.7 |
| 3,018,863 | 1/1962 | Elfes | 192/48.7 |

FOREIGN PATENTS

| 704,129 | 2/1965 | Canada | 192/99 |

Primary Examiner—Allan D. Herrmann
Attorney—Walter Spruegel

ABSTRACT: Provided for separate clutches in dual power drives in tractor or the like vehicles are separate foot pedals for actuating the respective clutches, with the pedals having followers of which each follower projects into the swing path of the other pedal, and the followers being arranged so that on depression of either pedal through successive stages its associated clutch is disengaged and the other pedal is taken along by the follower arrangement to disconnect the other clutch.

INVENTORS
Herbert Hubernett
Jean N. Logothetopoulos
By
Attorney.

CLUTCH CONTROLS FOR TRACTOR VEHICLES

This invention relates to clutch controls for tractor or the like vehicles with separate lever-actuated clutches for vehicular ride and for for a plugshaft to power work equipment.

In such power drives with dual clutches it is known to actuate each clutch by an independent pedal. It is also known to actuate the plugshaft clutch by a hand lever. With the dual-pedal arrangement, therefore, only the ride clutch or the plugshaft clutch can be actuated, while in a pedal and hand lever arrangement both clutches may be simultaneously actuated. Since simultaneous actuation of both clutches is frequently required for more difficult work tasks, such as attending to loading while simultaneously mowing, for example, the human hand can actuate other control levers of the work or utility equipment only in secondary succession. This is hardly conducive to facile and quick control manipulations.

It is the primary object of the present invention to provide clutch actuating mechanism which eliminates these shortcomings, by arranging for selective first actuation of the ride clutch and following actuation of the plugshaft clutch, or vice versa, on a single manipulative operation. This is achieved according to the invention by providing the side-by-side arranged and parallel-shiftable operating levers with followers which project into the shift path of the other lever. With such an arrangement, both clutches may be actuated in selected succession without having to release the lever being actuated. In thus operating one lever, and in this case the main lever which is almost always in the form of a foot pedal, the ride clutch is first actuated with ensuing stopping of the vehicle, while the plugshaft continues its drive. It is only on a further shift of the main lever that the plugshaft is also stopped. In operating the other lever, i.e., the auxiliary lever, the order of operation is reversed, i.e., the plugshaft is first disconnected and then the ride shaft is disconnected.

In accordance with a further aspect of the invention, each follower in the shift plane of a lever is to be at such a distance from the latter that each lever disengages the associated clutch before coming into engagement with the follower in its path. Also, each follower is to be provided with a setscrew in the path of the respective lever for accurate adjustment of the engagement of the latter with the follower.

In accordance with another aspect of the invention, the main and auxiliary levers are formed as foot pedals. However, it is also feasible to provide the main lever as a hand lever, and it is also feasible to form the auxiliary lever as a combined hand and foot lever, so that, depending on the lever arrangement, both clutches may either be foot- or hand-actuated in the sequence of plugshaft clutch-ride clutch.

In accordance with a further aspect of the invention, the auxiliary pedal, which is on a preferred common pivot axis with the main pedal, is in a stop-determined home or inoperative position displaced from the main pedal in the direction opposite to its foot operation by an angle within which disconnection of the plugshaft clutch is achieved. In addition, the foot tread on the auxiliary pedal will be substantially on the same lever as that of the main pedal when the plugshaft clutch is disengaged, so that on continual foot operation of the auxiliary pedal the foot simultaneously engages the tread on the main pedal.

Since the pedals are located in the operator's path onto and from the vehicle seat, the higher auxiliary pedal is advantageously formed in two parts of which one is collapsible on the other, clutch linked, part and releasably lockable to the latter against collapse thereon. When the lock is released and the one part collapsed, the auxiliary pedal is spring-urged against a stop on the main pedal at which its tread is at the lower level of that on the main pedal. This is resorted to for operations without the plugshaft, such as in mere riding on roads, for example. The auxiliary pedal then does not interfere with the operator getting on or off the vehicle, and the operator has only the main pedal available for actuation so that the ride clutch is then always actuated first. Of course, a hand lever arrangement may be made similarly collapsible.

Figure 1:
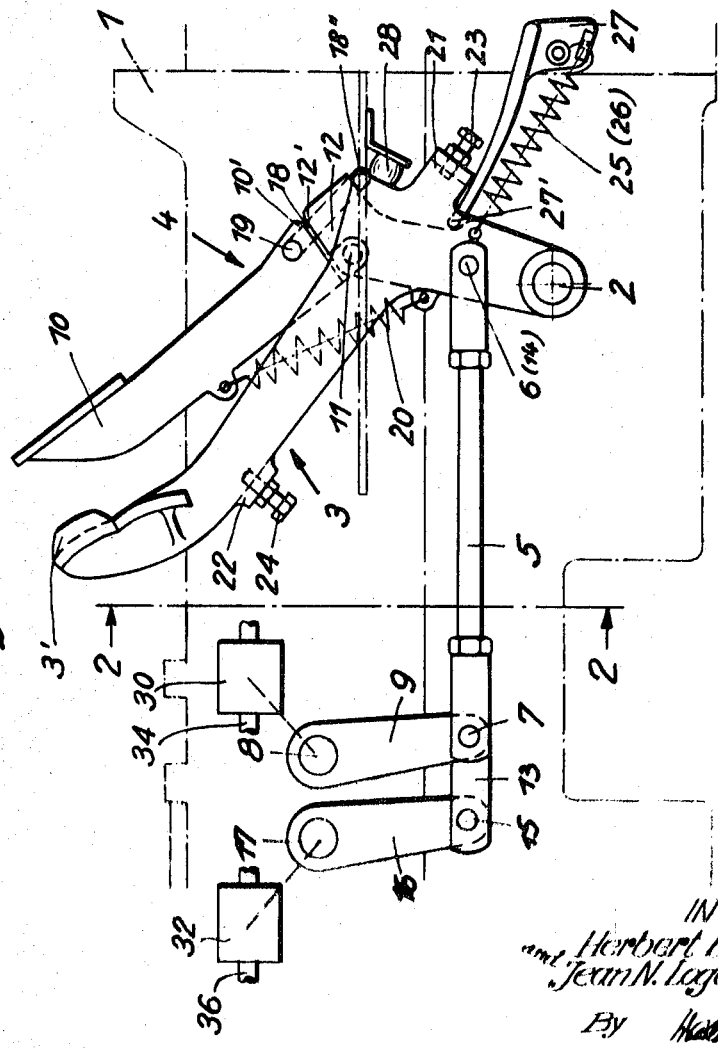

In the drawings, which show one embodiment of the invention,

FIG. 1 is a side view of clutch actuating mechanism according to the invention; and FIG. 2 is a sectional view of the same mechanism taken on the line 2–2 of FIG. 1.

Referring to the drawings, the reference numeral 1 designates a clutch housing of a power drive of a tractor or the like vehicle. Provided on the housing 1 is a pivot mount 2 for a main pedal or lever 3 and an auxiliary pedal or lever 4 for a ride-drive or ride clutch 30 and a ride-drive or plugshaft clutch 32. The main pedal 3 is connected with the usual shifter fork (not shown) of the ride clutch through a link 5 which at 6 and 7 is connected with the main pedal and with a mounted lever 9 on a fork shifter shaft 8.

The auxiliary pedal 4 is formed in two parts or arms of which one is a forward foot lever 10 pivoted at 11 to the other part or lever 12 which is turnable on the pivot mount 2. A link 13 is pivotally connected at 14 and 15 with the lever 12 and with a lever 16 which actuates the shifter shaft 17 and the shifter fork thereon for the plugshaft clutch. The foot lever 10 is so connected with the lever 12 that it may turn anticlockwise about the pivot 11, but is locked against clockwise turning by stops 10' and 12' on the levers 10 and 12. For operative connection of the lever 12 with the foot lever 10 there is provided a yoke 18 of which one leg 18 is at 19 journaled in the stop 10' of the foot lever 10, and its other leg 18" reaches behind the stop 12' of the lever 12. Also arranged between the levers 10, 12 is a spring 20 which acts to take up all play between these levers in their locked or unlocked condition on the one hand, and to hold the foot lever 10 in engagement with the main pedal 3 on unlocking the former by swinging the yoke 18 anticlockwise about 19 (FIG. 1).

Extending from the main pedal 3 into the swing plane of the auxiliary pedal 4 are followers 21, 22 with setscrews 23, 24. With this arrangement, the follower 21 will, on actuation of the main pedal 3, subsequently take along the auxiliary pedal, and the follower 22 will, on actuation of the auxiliary pedal 4, subsequently take along the main pedal. Acting on both pedals are springs 25, 26 which are anchored to a holder 27 on the housing. These spring will return the pedals to their home positions which are determined, by a rubber pad 28 on the floor board for the main pedal 3, and by a stop 27' on the holder 27 for the auxiliary pedal.

The mechanism performs as follows. On stepping with the foot on the outwardly bent, large tread 3' the main pedal 3, the ride clutch will, on initial depression of the main pedal with its follower 21 into engagement with lever 12 of the auxiliary pedal 4, be disengaged to disengage the ride-drive 34 so that the vehicle will come to a stop. The plugshaft keeps on running at this pedal position. On continued depression of the main pedal 3, the follower 21 takes along lever 12 of the auxiliary pedal 4 with ensuing disengagement of the plugshaft clutch and work-drive 36 to stop the plugshaft.

On depressing the auxiliary pedal 4 with its parts 10 and 12 interlocked by the yoke 18 (FIG. 1), the plugshaft clutch will be disengaged and the plugshaft stopped, whereupon on continued depression of the auxiliary pedal the same engages the follower 22 and takes along the main pedal 3 to stop the vehicle ride. Thus, depending on circumstances, the operator has the choice to first actuate either one of the clutches, and subsequently to actuate the other clutch without changing to the other pedal. The safety factor in operation of the controls is thereby considerably increased.

We claim:

1. Clutch actuating mechanism for a vehicle comprising work- and ride-drives, work-drive and ride-drive clutches in said work- and ride-drives, respectively, side-by-side arranged levers swingable in planes substantially parallel to each other, operating connections between said levers and clutches, respectively, for disconnecting the latter on swinging movement of the respective levers in one direction, and followers on one of said levers, of which each follower projects into the swing plane of the other lever, with each follower being spaced from its contact point on said other lever in said one direction so that upon actuation of one of said levers, said one disengages its associated clutch before engaging the other of said levers which in turn disengages its associated clutch.

2. Clutch actuating mechanism as in claim 1, in which each follower has an adjustable setscrew in the swing plane of said other lever.

3. Clutch actuating mechanism as in claim 1, in which there is provided a stop for the one lever associated with the work drive clutch in home position in which the same is displaced from the other lever opposite to said one direction an angular distance corresponding to that for disengagement of said work drive clutch.

4. Clutch actuating mechanism as in claim 1, in which the lever associated with the ride-drive clutch is a foot pedal with a large foot tread.

5. Clutch actuating mechanism as in claim 1, in which the lever associated with the work-drive clutch consists of two arms with a common pivot axis, of which one arm is pivoted on said axis and the other arm is pivotally mounted on the other arm for swinging movement in the swing plane of the latter, and means for releasably locking said arms against relative swinging movement.

6. Clutch actuating mechanism as in claim 5, in which said locking means is in the form of a yoke pivoted on one arm, and the other arm has a shoulder, with said yoke being swingable behind said shoulder for releasably locking said arms against relative swinging movement.

7. Clutch actuating mechanism as in claim 5, which further provides a spring urging said other arm from locked relation with said one arm.